United States Patent [19]
Moren

[11] 3,793,577
[45] Feb. 19, 1974

[54] DEVICE FOR CONTROLLING THE INTERMITTENT OPERATION OF A WINDSHIELD WIPER MOTOR

[75] Inventor: Lars Gunnar Moren, Huddinge, Sweden

[73] Assignee: Aktiebolaget Electrolux, Stockholm, Sweden

[22] Filed: Sept. 19, 1972

[21] Appl. No.: 290,335

[52] U.S. Cl............ 318/DIG. 2, 318/443, 337/111, 337/379
[51] Int. Cl. ............................................. B60s 1/08
[58] Field of Search 318/443, DIG. 2; 337/111, 379

[56] References Cited
UNITED STATES PATENTS

| 3,573,585 | 4/1971 | Taylor | 318/443 |
| 3,603,858 | 9/1971 | Ugo | 318/443 |
| 3,624,477 | 11/1971 | Rieman | 318/443 |
| 3,643,145 | 2/1972 | Tann | 318/443 |

Primary Examiner—B. Dobeck

[57] ABSTRACT

An arrangement for connection in an electric circuit of a vehicle windshield wiper that can be operated intermittently, and having at least one electric contact in the circuit which can be connected or disconnected to the voltage source at selected intervals. The circuit includes a bi-metallic strip which is provided with a heating winding that heats the strip and bends it in the direction of the electrical contact to thereby actuate the same. When the bi-metallic strip is cooled down, it bends in a direction away from the contact. A constant length of intervals between the connection of the windshield wiper motor and the disconnection of the same is achieved.

6 Claims, 2 Drawing Figures

DEVICE FOR CONTROLLING THE INTERMITTENT OPERATION OF A WINDSHIELD WIPER MOTOR

BACKGROUND OF THE INVENTION

In intermittently operating devices of known type which incorporate a bi-metallic strip, the variations in ambient temperature will cause the strip to be heated or cooled at different rates. When this occurs, the strip will either bend faster or slower, thereby not ensure a constant length of the time intervals during which the device is connected or disconnected from the circuit. Furthermore, in known devices, relatively complicated and expensive means have been utilized to compensate for the temperature variations of the ambient. For example, the bi-metallic strip can be connected to another strip which is actuated by the temperature of the ambient and bends in dependence thereon.

DESCRIPTION OF THE INVENTION

This invention relates to a control device for the intermittent operation of a vehicular windshield wiper that operates at contstant intervals even during large variations in the ambient termperature.

It is an object of the present invention to provide a bi-metallic strip for controlling the operability of a windshield wiper motor. The path of movement of the strip from its idle position to a position near the contact corresponds to the heating of the strip to a relatively high temperature so that the additional bending of the strip as a result of the normal variations in the ambient temperature is negligible as compared to the bending occurring as a result of the high heating temperature of the strip. It is therefore a prime objective of the present invention to provide a device for controlling the intermittent operation of a windshield wiper motor in which predetermined constant intervals of operation can be maintained in spite of large variations in the ambient temperature.

It is another object of the present invention to provide a bi-metallic strip for control of the operation of a windshield wiper motor that will cool down quickly and in which the length of intervals between operation and non-operation of the windshield wiper motor can be varied between wide limits.

The present invention will now be more fully described with reference to the accompanying drawings in which:

FIG. 1 is a schematic diagrammatic view of the device for intermittently controlling the operation of a windshield wiper motor constructed in accordance with the teachings of the present invention, and FIG. 2 is a diagrammatic view of the positioning of the bi-metallic strip relative to the associated contact.

DESCRIPTION OF THE PREFERRED EMBODIMENT

Figure 1:
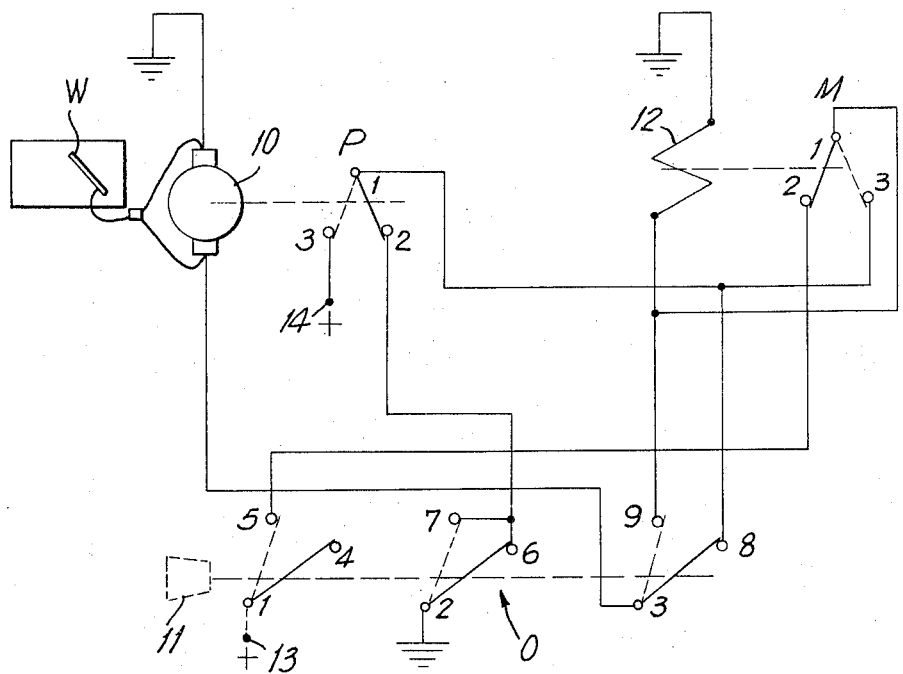

Referring to the wiring diagram of FIG. 1, a windshield wiper motor 10 is shown provided with a parking change-over switch P. Another change-over switch 0 is illustrated having a switch-over member 11 that can be operated manually. A heating winding 12 is operatively connected to a bi-metallic strip, which in turn actuates the change-over switch M that is located adjacent thereto.

The change-over switches P and M have shifting contacts 1 which can assume either the position 2 or the position 3, respectively. It will be noted that the change-over switch 0 has three separate shifting contacts 1, 2, and 3 that can assume the positions 4, 6, and 8 or the positions 5, 7, and 9, respectively.

It will be noted that FIG. 1 shows in full line positions the various switches and contacts in the inopertiive position of the device. When the shifting contacts 1, 2, and 3 are shifted by means of the switch-over member 11 to the positions 5, 7, and 9, as seen in dotted lines, the bi-metallic heating winding 12 receives current from the voltage source 13. The current takes the path through contacts $0_{1,5}$ and $M_{2,1}$. Simultaneously, the motor 10 becomes operative due to the current flowing from the voltage source 13 through the contacts $O_{1,5}$, $M_{2,1}$, and $O_{9,3}$ to the motor.

When the motor 10 commences to operate and in turn operates the windshield wiper W, the motor 10 shifts the contact $P_1$ to the position 3 in a well-known manner; however, as long as the contact $M_1$ is in the position $M_{1,2}$, shown in full lines in FIG. 1, the motor 10 receives current from the voltage source 13 through the above-described path. Subseqeuntly, as the motor 10 again passes the initial position, the contact $P_1$ is shifted to position 2.

After the motor becomes operative, it is desirable that the motor operate the windshield wiper a few strokes before the intermittent operation is started. The length of this initial interval corresponds in time to the time required for heating the winding 12 up to the operative temperature of the bi-metallic strip. When the necessary temperature has been reached, the bi-metallic strip 15 (FIG. 2) is bent so much that the change-over switch M IS actuated to shift the contact $M_1$ to the position $M_3$ as seen in dotted lines in FIG. 1. In this position, the supply of current to the heating winding 12 stops and the bi-metallic strip cools down. If the contact $P_1$ is in position 3 and the change-over switch $M_1$ is in position 3, the motor 10 receives current from the voltage source 14 through contacts $P_{3,1}$, $M_{3,1}$, and $O_{9,3}$. When the motor 10 passes its intial position and the contact $P_1$ is shifted to position 2, the motor is grounded through contacts $O_{2,7}$, $P_{2,1}$, $M_{3,1}$, and $O_{9,3}$. When this occurs, the motor 10 is braked and stops in the initial position.

The contact $M_1$ is again shifted to position 2 when the bi-metallic strip 15 has cooled down sufficiently. When this occurs, both the motor 10 and the heating winding 12 for the bi-metallic strip 15 receive current from the same current path as previously described. Moreover, as long as the change-over switch O is in the laft hand, dotted line position, as seen in FIG. 1, the operative procedure described in connection therewith is carried out.

In order to disconnect the present device, the switch-over member 11 is manipulated in order to move the change-over switch O to the right as shown in solid lines in FIG. 1. If the contact $P_1$ is in position 3, the motor receives current from the voltage source 14 through the contacts $P_{3,1}$ and $O_{8,3}$. When the motor 10 has reached its initial position, the contact $P_1$ is shifted to position 2 and hte motor 10 is grounded through the contacts $O_{2,6}$, $P_{2,1}$, and $O_{8,3}$. In this condition, the motor 10 is braked and stops.

Figure 2:
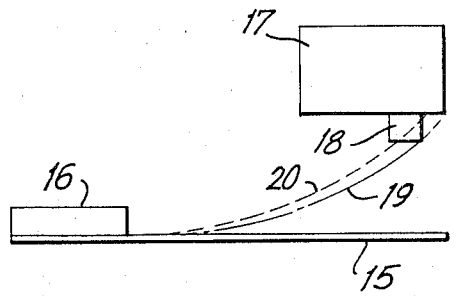

As seen in FIG. 2, the bi-metallic strip 15 is shown in full lines in the idle position, or when cold, and secured to an attachment block 16. The dashed lines 19 and 20 represent the positions of the bi-metallic strip 15 at two different high temperatures of the strip. A contact member 17 is shown in a position located at a relatively great distance from the idle position of the bi-metallic strip 15. The contact member 17 corresponds to the change-over switch M of FIG. 1 and may take the form of a microswitch. The contact member 17 is provided with an operating button 18 which is engaged by the bi-metallic strip 15 when the latter bends to predetermined positions. The operating button 18 is so constructed and arranged that it must be depressed a certain predetermined distance before the shifting of contact M occurs. Furthermore, the strip 15 must move away from the contact member 17 a given distance before the shifting of contact M back to its initial position.

When the device is connected and the motor 10 is operative, the heating winding 12 of the bi-metallic strip 15 is heated and the strip bends to the position 19 shown by dashed lines in FIG. 2. During the continued bending of the strip 15, the operating button 18 is pushed into the contact member 17 and when the position 20, as seen in FIG. 2, has been reached by the strip 15, the shifting of contact M occurs as described above. Because of the shift in contacts of contact M, the current to the heating winding 12 is cut off and the bi-metallic strip 15 cools down and returns to position 19 of FIG. 2. When this takes place, the contact M is again shifted and current is again supplied to the heating winding 12.

It should be apparent that the elapsed times required for the bi-metallic strip 15 to move from position 19 to position 20 and vice versa are very constant, and the movement of the strip is not subject to influence as a result of the variations in the ambient temperature. This is so because the bi-metallic strip 15 is heated to a comparatively high temperature causing the strip 15 to bend a relatively long distance and consequently the windshield wiper motor 10 takes a relatively long time to be connected and the initial stage of the intermittent operation started. After this stage of operation of the motor, the latter will become inoperative and will return to its parking position and remain in that position during the time required for the bi-metallic strip 15 to bend back from position 20 to position 19. It should be noted that the motor 10 is only connected to the voltage source when the strip 15 moves from position 19 to position 20. It should then be apparent that the elapsed time during which the motor 10 is connected and operative can be varied by simply changing the input to the heating winding 12. If the input is to be increased, the bi-metallic strip 15 will be heated in a shorter period of time and the time of operation of the motor is reduced. Obviously, the elapsed time during which the motor is inoperative can also be varied simply by changing the cooling down step of the strip 15. The operational temperature of the strip 15 is increased or reduced by placing the contact member 17 at different distances from the idle or rest position of the strip 15.

The present intermittently operating device has a good constancy of intervals of the operational periods of the motor and therefore, the device can be used in locations where the operational temperature varies to a much higher extent than could be permitted with prior art devices of this type. This desirable attribute is of special importance when it is desired to mount the windshield wiper motor and auxiliary equipment in the engine compartment of a vehicle.

The present construction ensures the predictable intermittent operation of a windshield wiper motor in spite of wide variations in the ambient temperature.

What is claimed is:

1. A control device for the intermittent operation of a windshield wiper motor positioned in an area of wide ambient temperature variations comprising:
   A. an electric circuit having a voltage source and at least one electric contact adapted to be connected to or disconnected from the voltage source at given intervals;
   B. a bi-metallic strip adapted to be heated and arranged when heated to bend towards the contact in order to engage therewith and actuate the contact which interrupts the electric circuit, and when cooled to bend away from the contact permitting the electric circuit to be reconnected to the voltage source; said bi-metallic strip being adapted to assume an idle position when cold and at least two bent positions when heated, a first bent position being located near said contact at a relatively long distance from said idle position and the second bent position being located a relatively short distance from the first bent position and operating to engage said electric contact and thereby connect said electric circuit to the voltage source; and
   C. the bi-metallic strip being so constructed and arranged that its path of movement from said idle position to said first bent position near the contact results from the heating of the strip for said given interval to so high a temperature that the further bending of the strip caused by the normal variations in the ambient temperature is a negligible part of the bending of the strip.

2. A control device constructed in accordance with claim 1 wherein said bi-metallic strip is provided with a heating winding.

3. A control device constructed in accordance with claim 1 wherein the electric contact is provided with an operating button that is adapted to be engaged by a part of the bi-metallic strip.

4. A control device constructed in accordance with claim 1 wherein the contact is a shiftable contact in which in the first bent position of the bi-metallic strip said contact is not actuated thereby and the motor is connected to the voltage source, and in the second bent position of the bi-metallic strip the latter engages the contact and the motor is disconnected from the voltage source.

5. A control device constructed in accordance with claim 1 further comprising a change-over switch having a switchover member for manually switching the contacts on the changeover switch.

6. A control device constructed in accordance with claim 4 wherein the idle position of the bi-metallic strip is a relatively great distance from the contact.

* * * * *

UNITED STATES PATENT OFFICE
CERTIFICATE OF CORRECTION

Patent No. 3,793,577         Dated February 19, 1974

Inventor(s) LARS GUNNAR MOREN

It is certified that error appears in the above-identified patent and that said Letters Patent are hereby corrected as shown below:

On the cover sheet, insert -- [30] Claims Foreign Priority Data   Sweden   12413/71   September 30, 1971 --.

Signed and sealed this 13th day of August 1974.

(SEAL)
Attest:

McCOY M. GIBSON, JR.
Attesting Officer

C. MARSHALL DANN
Commissioner of Patents